Patented Feb. 19, 1952

2,586,512

UNITED STATES PATENT OFFICE 2,586,512

CYCLOHEXYL-AMINO-ALCOHOLS

Robert R. Burtner and William M. Selby, Skokie, Ill., assignors to G. D. Searle & Co., Chicago, Ill., a corporation of Illinois No Drawing. Application September 15, 1948, Serial No. 49,462

4 Claims. (Cl. 260—563)

This invention relates to certain amino alcohols characterized by having a cyclohexane nucleus linked to the carbon atom to which the hydroxyl group is attached, to salts thereof, and to processes for preparing such compounds. More particularly, this invention relates to amino alcohols of the following general structural formula

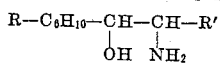

wherein R and R' represent hydrogen or lower alkyl radicals, and wherein $C_6H_{10}$ is a cyclohexane nucleus in which the R group may be substituted at any point.

This application is a continuation-in-part of our copending application Serial No. 723,650, filed January 22, 1947, now abandoned.

In the compounds of the above structural formula, R and R' each may represent a hydrogen atom or the same or different lower alkyl radicals, such as methyl or ethyl. These basic compounds form salts by the addition of one equivalent of an acid. The amino alcohol bases are poorly soluble in water, while the salts generally exhibit a greater water solubility. The use of salts is therefore frequently desirable in pharmaceutical applications. The salts may be prepared by adding an alcohol solution of the desired acid to an ethereal solution of the amino alcohol, or they may be formed in aqueous solution and used as such or obtained in solid form by evaporation. Among the acids which are suitable for forming salts of these compounds are hydrochloric, hydrobromic, sulfuric, phosphoric, tartaric, citric, sulfamic, maleic, acetic, benzoic, cinnamic, and the like.

The compounds of this invention have useful therapeutic properties, particularly as agents for causing the shrinking of swollen or engorged nasal mucosa. For such use, these amino alcohols are advantageously presented in dilute aqueous solutions, preferably as salts of non-toxic acids, to which solutions there may be added other substances to serve as buffering, flavoring, perfuming, preservative, or active therapeutic agents. For application to the nasal mucosa, these compounds are best prepared in dilute aqueous solution buffered to a faintly acid pH.

The compounds of this invention are conveniently prepared by the reduction, preferably catalytic, of the corresponding nitroalcohols. For this reduction, Raney nickel is an excellent catalyst. Noble metal catalysts such as palladium black and platinum oxide, and supported noble metal catalysts, are also suitable. The nitro alcohols are in turn readily produced by the condensation of hexahydrobenzaldehyde or tetrahydrobenzaldehyde, or alkyl-substituted products thereof, with lower nitroalkanes such as nitromethane, nitroethane, or 1-nitropropane. When tetrahydrobenzaldehyde or an alkylation product thereof is used as a starting material, the double bond of the tetrahydrophenyl radical is reduced, generally at the same time that the nitro group is reduced.

It is apparent from an inspection of the foregoing structural formula that there will be at least two, and in most instances, four, possible optical isomers of each of the compounds. For example, when R' represents hydrogen there is one asymmetric carbon atom, namely the carbonyl carbon atom, and two optical isomers exist. When R' represents an alkyl radical, there are two asymmetric centers, namely the carbonyl carbon atom and the carbon atom bearing the amino radical. Consequently, in this instance there will be four optical isomers existing in two racemic pairs. This is illustrated by Examples 4 and 7 of this application. In Example 4, the hydrochloride of the 2-amino-1-cyclohexyl-1-propanol produced from hexahydrobenzaldehyde melts at 210° centigrade. The corresponding hydrochloride of the 2-amino-1-cyclohexyl-1-propanol prepared from $\Delta^3$-tetrahydrobenzaldehyde is shown in Example 7 and melts at 163–165° C. Each of these compounds represents a fairly pure racemate or mixture of enantiomorphs. Each on resolution provides two optically active isomers, making a total of four optical isomers. It is therefore apparent that while the examples lead in each case to a racemic mixture of isomers, these may be resolved into the component optically active forms by resolution procedures.

For use, solutions of the compounds of this invention may be sprayed, dropped, packed, or otherwise applied to the nasal mucosa. In a number of trials on human subjects under the supervision and observation of a physician, a 2% solution prepared by the method illustrated in Example 3 has consistently caused marked shrinkage of swollen areas of the nasal mucosa within from two to four minutes. In so doing there has been no irritation experienced by the patient and no observable effect on pulse, blood pressure, or respiration. The shrinkage has been effective for at least four hours, and repeated administration at four hour intervals over periods of several days has not resulted in any irritation, secondary turgescence, or other undesirable effects. The lack of any irritating properties has further been demonstrated by injection of such solutions into the anterior chamber of a rabbit's eye.

Our invention is further disclosed by the appended examples. The following serve as specific examples of how these compounds may be prepared, without in any way limiting the invention.

*Example 1*

*2-nitro-1-cyclohexyl-1-propanol.*—40 grams of nitroethane, 30 cubic centimeters of ethyl alcohol and 1.1 cc. of 10 N sodium hydroxide are stirred together at 30–35° centigrade, and the dropwise addition of 60 g. of hexahydrobenzaldehyde is started (the temperature being maintained at 30–35° C. throughout). When about 2/3 of the aldehyde has been added, 4 cc. of water and 1.1 cc. of 10 N sodium hydroxide are added and the dropwise addition of the balance of the aldehyde continued. An hour after the addition is complete, 12 cc. of ethanol is added, the stirring discontinued, and the mixture is allowed to stand for about five days at 37° C. 1.8 cc. of concentrated HCl are then added, the mixture is shaken, and the aqueous layer which separates on standing is discarded. The remainder is diluted with 200 cc. of ether, washed twice with water and dried over sodium sulfate. After removal of the solvents, the residual crude nitro-alcohol is purified by distillation. It is a pale yellow oil which boils at 119° to 123° C. at 2 millimeters pressure. Its index of refraction ($n_D^{25}$) is 1.4845.

*Example 2*

*2-amino-1-cyclohexyl-1-propanol.*—A solution of 50 g. of the above nitro-alcohol in 150 cc. of methanol and 17.4 g. of acetic acid is treated with hydrogen gas at 1000 pounds per square inch pressure in the presence of Raney nickel catalyst. After about 6½ hours the catalyst is removed by filtration and the solvent evaporated. The residue is dissolved in water, washed with ether, and NaOH is added to the aqueous phase until it is alkaline to phenolphthalein. The base is then extracted with ether and purified in the customary manner by distillation. It is obtained as a colorless oil which boils at 82–85° C. at 0.5 mm. pressure and solidifies on standing to a crystalline mass having a melting point of 54–55° C.

It will be quite apparent that, by the use in Example 1 of an alkyl hexahydrobenzaldehyde or of nitromethane or 1-nitropropane in place of the reagents specified, all of the compounds comprehended within this invention may be obtained. For instance, when 1-nitropropane is condensed with hexahydrobenzaldehyde and the resulting nitro alcohol is reduced in accordance with the methods of Examples 1 and 2, there is produced 2-amino-1-cyclohexyl-1-butanol, which has the formula

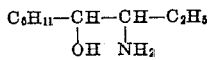

By a similar procedure starting with nitromethane, there is produced 2-amino-1-cyclohexylethanol of the formula

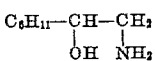

*Example 3*

5 g. of 2-amino-1-cyclohexyl-1-propanol as prepared in Example 2 are dissolved in 170 cc. of water, and diluted to 350 cc. with physiological salt solution (0.9% NaCl). To this is added 13 cc. of 8.5% aqueous hydrochloric acid, followed by 24 cc. of 1.89% disodium phosphate solution, and the whole adjusted to 500 cc. with physiological salt solution. This results in a 1.0% solution of the aminoalcohol in an isotonic aqueous medium whose pH is about 6.0.

While the above formulation is convenient and non-irritating, it will be obvious that other acids (such as sulfuric or phosphoric) may be used in place of the hydrochloric acid specified, and that other innocuous buffering agents may be used in place of the sodium phosphate. It will be equally obvious that bactericides, perfuming and flavoring agents, or any of them, or therapeutic agents for other specific purposes may be added as desired in preparing pharmaceutical solutions for various purposes.

While a 1% solution prepared as described above is quite satisfactory for many purposes, a 2% solution may be used in clinical practice without irritation or any deleterious side effects, and will be found more prompt and complete in its effects. While it is possible that stronger solutions than 2% might be desirable for some special applications, it has been our experience that such a solution will meet any reasonable need. However, for prescription use, a considerably stronger stock solution may be prepared which can be diluted to the desired strength by a physician, pharmacist, or other practitioner, such dilution advantageously being made with an innocuous isotonic liquid such as a physiological salt solution or Ringers solution, or with other pharmaceutically active preparations as may seem desirable. Similar solutions may be prepared in exactly analogous manner from the aminoethanols and the aminobutanols and their alkyl derivatives which are included within this invention.

*Example 4*

0.57 g. of 1-cyclohexyl-2-amino-1-propanol (Example 2) in 20 cc. of absolute ether are treated with one equivalent of absolute alcoholic hydrogen chloride. An oily precipitate of the salt is formed, which soon crystallizes. It is collected on a filter, rinsed with ether and dried in vacuum over sodium hydroxide. After recrystallization from a mixture of isopropyl alcohol and ethyl acetate (1:4 by volume), 1-cyclohexyl-2-amino-1-propanol hydrochloride melts at 212° C.

1-cyclohexyl-2-amino-1-propanol citrate is prepared in an analogous manner. It is a noncrystalline substance which is readily soluble in water.

*Example 5*

$\Delta^3$-*Tetrahydrobenzaldehyde.*—A solution of 112 g. of acrolein in 100 g. of cyclohexane is added at one time to 108 g. of butadiene (contained in bomb liner and chilled in Dewar flask). The resulting solution occupies approximately 50% of the bomb capacity at that temperature. The bomb is then heated, the source of heat being automatically discontinued when the temperature reaches 70° C. The temperature rises spontaneously to about 125° C. and remains there for approximately fifteen minutes. As soon as the temperature begins to drop, the bomb is again heated sufficiently to raise the temperature to 160° C. By this time the pressure, which had previously risen to a maximum of 250 lbs. per sq. in., drops to about 150 lbs. After twenty minutes the temperature begins to fall, at which point the bomb is quenched in a large bath of cold water. The contents are removed and distilled in vacuum to yield 175 g. of Δ³-tetrahydrobenzaldehyde, boiling point 63–64° C. at 20 mm.; $n_D^{25}=1.4712$.

Example 6

2-nitro-1-(Δ³-cyclohexenyl) - 1 - propanol.—51.5 g. of Δ³-tetrahydrobenzaldehyde are added dropwise to a stirred solution of 34.5 g. of freshly distilled nitroethane and 0.93 cc. 10 N NaOH in 25.5 ml. of ethanol at 30–35° C. (internal temp.). When ⅔ of the aldehyde has been added, 3.4 ml. of water and 0.93 ml. of 10 N NaOH are added. The addition of the balance of the aldehyde is carried out as described above. Stirring is continued until the temperature spontaneously drops below 30° C. The mixture is then stored at 37° C. for five days to complete the reaction. 1.5 ml. of concentrated HCl are added, the mixture shaken vigorously, and the aqueous layer discarded. 200 ml. of ether are added, and the solution is washed thrice with saturated salt solution. After drying over anhydrous Na₂SO₄ and removal of solvent, the product is distilled. There is obtained 61.8 g. of pale yellow 2-nitro-1-(Δ³-cyclohexenyl)-1-propanol, B. P. 127–8°/1.2 mm.; $n_D^{25}=1.5005$.

Example 7

2-amino-1-cyclohexyl-1-propanol.—A solution of 100 g. of 2-nitro-1-(Δ³-cyclohexenyl)-1-propanol and 35 g. of acetic acid in 300 ml. of methanol is reduced in the presence of Raney nickel under 1000 lbs. p. s. i. hydrogen at 70° C. The absorption of hydrogen practically ceases after four to six hours. The catalyst is filtered out and the solvent removed under reduced pressure. 150 ml. of water are added, and the resulting solution is washed with ether. The free base is liberated by the addition of an excess of 40% NaOH. After extraction with ether, drying over anhydrous K₂CO₃ and removal of solvent, the 2-amino-1-cyclohexyl-1-propanol is distilled; yield 54 g. of colorless oil, B. P. 112–114° C. at 6 mm.; $n_D^{27}=1.4979$. On cooling the product solidifies to a white waxy solid which melts at about 55° C. The hydrochloride, prepared by addition of one equivalent of absolute alcoholic HCl to an ethereal solution of the base, is a white crystalline solid melting at 163–165° C. after crystallization from a mixture of isopropyl alcohol and ethyl acetate.

Example 8

2-amino-1-cyclohexyl-1-propanol sulfate is obtained by dropwise addition of a cold solution of one equivalent of sulfuric acid in ethyl acetate to a stirred ethyl acetate solution of the base prepared in Example 7. It is a colorless white powder which melts with decomposition at 304° C. Crystallization from a mixture of acetic acid and ethyl acetate does not alter this melting point.

The bis-3,5-dinitrobenzoate is formed as follows. A solution of 9.3 g. of 3,5-dinitrobenzoyl chloride in 50 ml. hot benzene is added at one time to a solution of 3.14 g. of the base and 10 g. of pyridine in 25 ml. benzene. The mixture is refluxed for 5 hours, cooled and added to 300 ml. of water containing 5 g. of NaOH. 200 ml. of ether are added, and the resulting solution is washed with water and finally dried over anhydrous Na₂SO₄. Removal of solvent followed by three crystallizations from acetic acid gives a colorless product which sinters at 179° C. and liquefies at 200° C.

Example 9

The bis-3,5-dinitrobenzoate of the other isomer of 2-amino-1-cyclohexyl-1-propanol is made as follows:

A solution of 9.3 g. of 3,5-dinitrobenzoyl chloride in 50 cc. of hot benzene is added to a solution of 3.14 g. of 2-amino-1-cyclohexyl-1-propanol (Example 2) in 25 cc. of benzene and 10 cc. of pyridine. A precipitate forms immediately. The mixture is refluxed for 5 hours, cooled and poured into 300 cc. of water containing 5 g. of NaOH. The benzene layer soon sets to a slush. It is removed by filtration and the filter cake is washed with water and dried. On recrystallization from acetic acid, the bis-dinitrobenzoate of 2-amino-1-cyclohexyl-1-propanol forms colorless crystals which soften at 195° C. and melt at 205° C. Further recrystallization does not change this melting point.

We claim:

1. A member of the group consisting of the aminoalcohols of the formula

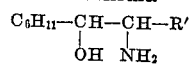

in which R′ is chosen from the group consisting of H, CH₃ and C₂H₅, and in which C₆H₁₁ is a cyclohexane nucleus, and the salts thereof with acids.

2. 2-amino-1-cyclohexyl-1-propanol.
3. 2-amino-1-cyclohexyl-1-ethanol.
4. 2-amino-1-cyclohexyl-1-butanol.

ROBERT R. BURTNER.
WILLIAM M. SELBY.

REFERENCES CITED

The following references are of record in the file of this patent:

UNITED STATES PATENTS

| Number | Name | Date |
|---|---|---|
| 1,356,877 | Nagai | Oct. 26, 1920 |
| 1,973,647 | Nagai | Sept. 11, 1934 |
| 2,350,318 | Shonlee et al. | May 30, 1944 |
| 2,369,711 | Blythe | Feb. 20, 1945 |

OTHER REFERENCES

Braun: "Ber. Deut. Chem.," vol. 56, pp. 2178–2185 (1923).

Braun et al.: "Ber. Deut. Chem.," vol. 58, pp. 2210–2215 (1925).

Gunn et al.: "J. Physiol.," 97, pp. 453–470 (1940).

Ovakimian et al.: J. Biol. Chem., 135, pp. 91–98 (1940).

Kuna et al.: "J. Biol. Chem.," vol. 137, pp. 337–342 (1941).

Goodman et al.: The Pharmacological Basis of Therapeutics, McMillan Co., N. Y., 1941, pp. 396–401.

Lands et al.: J. of Pharmacology and Experimental Therapeutics, April 1945, pp. 253, 254, 263.

Physiological Review, April 1946, pp. 185–196.